United States Patent
Galindo et al.

(10) Patent No.: US 10,000,683 B2
(45) Date of Patent: Jun. 19, 2018

(54) DRILLING FLUIDS WITH CROSSLINKED SULFONATE-CONTAINING POLYMERS DISPERSED IN HIGH DENSITY BRINES

(71) Applicant: Halliburton Energy Services, Inc., Houston, TX (US)

(72) Inventors: Kay Ann Galindo, Montgomery, TX (US); Hui Zhou, The Woodlands, TX (US); Weibin Zha, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 14/904,465

(22) PCT Filed: Jul. 1, 2015

(86) PCT No.: PCT/US2015/038815
§ 371 (c)(1),
(2) Date: Jan. 12, 2016

(87) PCT Pub. No.: WO2016/140698
PCT Pub. Date: Sep. 9, 2016

(65) Prior Publication Data
US 2016/0376488 A1    Dec. 29, 2016

Related U.S. Application Data

(60) Provisional application No. 62/127,587, filed on Mar. 3, 2015.

(51) Int. Cl.
*C09K 8/035*   (2006.01)
*C09K 8/12*    (2006.01)
(Continued)

(52) U.S. Cl.
CPC .............. *C09K 8/035* (2013.01); *C09K 8/12* (2013.01); *E21B 7/00* (2013.01); *E21B 21/00* (2013.01)

(58) Field of Classification Search
None
See application file for complete search history.

(56) References Cited

U.S. PATENT DOCUMENTS 4,690,996 A * 9/1987 Shih ..................... C08F 2/32
                                              507/103
5,204,320 A * 4/1993 Patel ..................... C09K 8/24
                                              507/121

(Continued)

OTHER PUBLICATIONS

International Search Report and Written Opinion for PCT/US2015/038815 dated Dec. 17, 2015.

*Primary Examiner* — Jeffrey Washville
(74) *Attorney, Agent, or Firm* — McDermott Will & Emery LLP

(57) ABSTRACT

Crosslinked sulfonate-containing polymers may be stable in high density, monovalent brines, which may render such polymers particularly useful in drilling fluids in general and, especially, in the subclass of drilling fluids known as drill-in fluids. For example, a drilling fluid may include a crosslinked sulfonate-containing polymer dispersed in a monovalent brine having a density of about 8 lb/gal to about 20 lb/gal, wherein the crosslinked sulfonate-containing polymer comprises: reactants of a first repeating unit and a crosslinker that react to form the crosslinked sulfonate-containing polymer, wherein the first repeating unit is a sulfonic acid-containing monomer present from 50% to 99.99% by weight of the reactants, and wherein the crosslinker comprises at least two olefinic bonds.

12 Claims, 1 Drawing Sheet

(51) Int. Cl.
*E21B 21/00* (2006.01)
*E21B 7/00* (2006.01)

(56) References Cited

U.S. PATENT DOCUMENTS

| | | | | |
|---|---|---|---|---|
| 5,620,947 | A | 4/1997 | Elward-Berry | |
| 6,423,802 | B1 | 7/2002 | Miller et al. | |
| 6,656,989 | B1* | 12/2003 | Benton | C08K 5/098 |
| | | | | 524/394 |
| 7,387,985 | B2* | 6/2008 | Kippie | C09K 8/08 |
| | | | | 166/308.2 |
| 2003/0116317 | A1 | 6/2003 | Chang et al. | |
| 2007/0204989 | A1 | 9/2007 | Tang | |
| 2014/0102707 | A1* | 4/2014 | Moradi-Araghi | C09D 5/4411 |
| | | | | 166/305.1 |
| 2015/0136402 | A1* | 5/2015 | Hurd | C09K 8/32 |
| | | | | 166/305.1 |

* cited by examiner

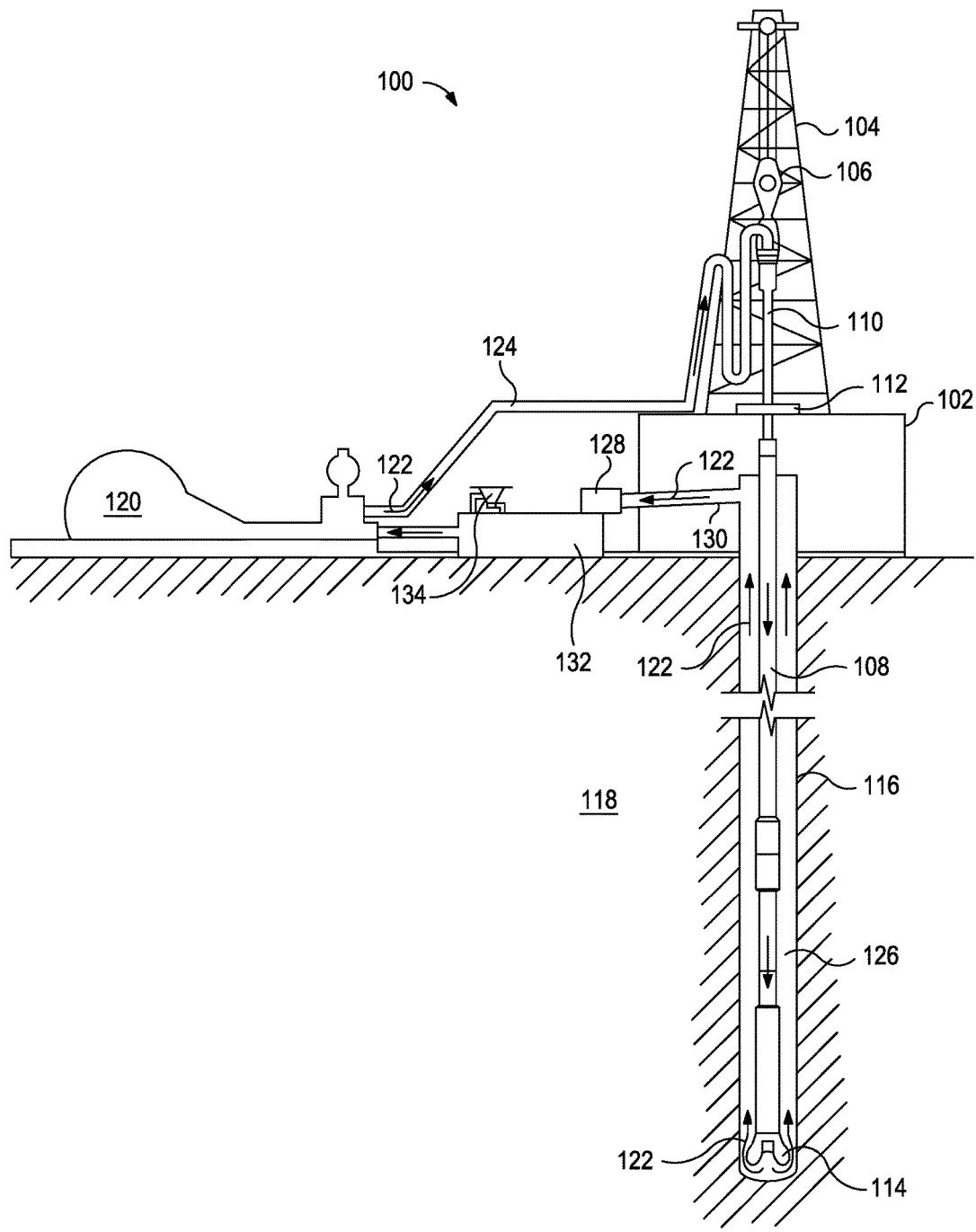

DRILLING FLUIDS WITH CROSSLINKED SULFONATE-CONTAINING POLYMERS DISPERSED IN HIGH DENSITY BRINES

BACKGROUND

A drilling fluid, sometimes known as a drilling mud, is a preparation of a base fluid (which may be oil-based or water-based), clays, and chemicals circulated in oil-well drilling for lubricating and cooling the bit, flushing the rock cuttings to the surface, and plastering the side of the well to prevent cave-ins. Drill-in fluids, sometimes known as reservoir drilling fluids, are a special category of drilling fluids used when drilling into and through the reservoir section of a subterranean formation. Generally, drill-in fluids include base fluids (such as brine), acid-soluble bridging agents, water-soluble polymers, pH stabilizers, and oxygen scavengers and exclude additives like clays and non-soluble weighting agents because such additives may plug pores and lead to difficult cleanup operations. Instead, heavy brines are generally used to set the density of the drill-in fluid, and water-soluble or water-swellable polymers are used as the rheology modifiers and fluid loss control agents. These polymers are generally biopolymers that degrade below 300° F., which reduces the viscosity of the fluid. At reservoir temperatures higher than 300° F., synthetic water-soluble polymers may be used, but such viscosifiers often cannot provide adequate viscosity at high temperatures, especially over the time frames for the drill-in operation. In addition, many viscosifiers are not as efficient when used in the brines used to provide the density of the drill-in fluid. Therefore, the thermal degradation of polymeric viscosifiers and the high salt content of the heavy brines continue to pose a very challenging hurdle for high temperature drill-in operations.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 illustrates an exemplary drilling system suitable for implementing the drilling fluids described herein.

DETAILED DESCRIPTION

The present application relates to drilling fluids with crosslinked sulfonate-containing polymers that are stable in high-density brines. The drilling fluids described herein may be useful as drilling fluids in general and, more specifically, as the subclass of drilling fluids known as drill-in fluids.

The drilling fluids described herein may include a crosslinked sulfonate-containing polymer dispersed in a monovalent brine. Such drilling fluids may have a density of about 8 to about 20 lb/gal.

Exemplary monovalent salts suitable for use in monovalent brines may include, but are not limited to, lithium formate, sodium formate, potassium formate, rubidium formate, cesium formate, lithium acetate, sodium acetate, potassium acetate, rubidium acetate, cesium acetate, lithium chloride, sodium chloride, potassium chloride, rubidium chloride, cesium chloride, lithium bromide, sodium bromide, potassium bromide, rubidium bromide, cesium bromide, and any combination thereof.

In some embodiments, the present disclosure provides a crosslinked sulfonate-containing polymer comprising a first repeating unit of a sulfonic acid-containing monomer and a crosslinker comprising at least two olefinic bonds. In some embodiments, the present disclosure provides a crosslinked sulfonate-containing polymer comprising a first repeating unit of a sulfonic acid-containing monomer, a second repeating unit of an N-vinyl amide and/or a terminal double bond-containing monomer, and a crosslinker comprising at least two olefinic bonds. As used herein, the term "polymer" (or "polymeric material") includes homopolymers, copolymers, terpolymers, tetrapolymers, etc. Additionally, the term "copolymer" is not limited to the combination of polymers having two monomeric units, but includes any combination of monomeric units (e.g., terpolymers, tetrapolymers, etc.). As used herein, the term "crosslinked" (or "crosslink") refers to any bond (e.g., covalent bond, ionic bond, and the like) linking one monomer or polymer chain to another polymer chain. The term "repeating unit" refers to a unit that repeats itself along a polymeric chain.

Each of the components of the crosslinked sulfonate-containing polymer described herein may be weighted based on the combined weight of the reactants. As used herein, the term "reactants" refers to the monomers and crosslinkers included in a reaction to make a polymer (e.g., the crosslinked sulfonate-containing polymer) before the reaction occurs. That is, the term "by weight of the reactants" means the combined weight of monomers (i.e., the sulfonic acid-containing monomer, the N-vinyl amide-containing monomer (when included), and the terminal double bond-containing monomer (when included)) and crosslinker(s) used to form the crosslinked sulfonate-containing polymer herein, before such monomer(s) and crosslinker(s) react.

In some embodiments, the crosslinked sulfonate-containing polymer may have the first repeating unit of the sulfonic acid-containing monomer in an amount ranging from a lower limit of about 50% to an upper limit of about 99.99%, and encompassing any value and subset therebetween. For example, in some embodiments, the crosslinked sulfonate-containing polymer may have the first repeating unit of the sulfonic acid-containing monomer in an amount by weight of the reactants of from 50%-65%, 55%-70%, 55%-85%, 55%-99.99%, 60%-99.99%, 65%-99.99%, 70%-99.99%, 75%-99.99%, 80%-99.99%, 85%-99.99%, 90%-99.99%, 95%-99.99%.

The sulfonic acid-containing monomer for use in forming the crosslinked sulfonate-containing polymers of the present disclosure may be any monomer comprising sulfonic acid. The term "sulfonic acid-containing monomer" refers to organosulfur compounds comprising the general formula $RS(=O)_2-OH$, where R is an organic group containing at least one olefinic group. In some embodiments, the sulfonic-acid containing monomer may be one or more of an acrylic sulfonic acid, a methylallyl sulfonic acid, an allyl sulfonic acid, a styrene sulfonic acid, a vinyl sulfonic acid, a vinyl aromatic sulfonic acid, any salt thereof (e.g., an acrylic sulfonate, a methylallyl sulfonate, an allyl sulfonate, a styrene sulfonate, a vinyl sulfonate, and a vinyl aromatic sulfonate), and any combination thereof. Examples of suitable sulfonic acid-containing monomers for use in the crosslinked sulfonate-containing polymers of the present disclosure may include, but are not limited to, 2-acrylamido-2-methylpropane sulfonic acid, 2-methacrylamido-2-methylpropanesulfonic acid, α-methyl styrenesulfonic acid, 2-sulfoethyl methacrylate, vinylbenzene sulfonic acid, 3-allyloxy-2-hydroxy-1-propanesulfonic acid, any salt thereof, any ester thereof, and any combination thereof. In some embodiments, the sulfonic acid-containing monomer may be one or more of a styrene sulfonate, a vinyl sulfonate, 2-acrylamido-2-methylpropane sulfonic acid, a salt of 2-acrylamido-2-methylpropane sulfonic acid, 3-allyloxy-2-hydroxy-1-propanesulfonic acid, and/or a salt of 3-allyloxy-2-hydroxy-1-propanesulfonic acid.

In some embodiments, the crosslinked sulfonate-containing polymer may have the second repeating unit in an amount ranging from a lower limit of about 1% to an upper limit of about 50% by weight of the reactants, encompassing any value and subset therebetween. For example, in some embodiments, the crosslinked sulfonate-containing polymer may have the second repeating unit in an amount by weight of the reactants of from about 5%-50%, 10%-50%, 15%-50%, 20%-50%, 25%-50%, 30%-50%, 35%-50%, 40%-50%, 45%-50%, 1%-20%, or 2%-40%.

In some embodiments, the second repeating unit may be an N-vinyl amide-containing monomer. As used herein, the term "N-vinyl amide-containing monomer" refers to an amide in which at least one vinyl group is attached to at least one nitrogen. In some embodiments, such N-vinyl amide-containing monomers may be either a combination of an acrylic and/or cyclic construct, and may be present in the crosslinked sulfonate-containing polymer described herein in any arrangement including, but not limited to, alternating, block, branched, linear, periodic, and/or random arrangements. Suitable cyclic N-vinyl amide-containing monomers may have between about 4 and about 15 total carbon atoms. In some embodiments, the N-vinyl amide-containing monomer may include, but is not limited to, a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

Suitable specific examples of N-vinyl amide-containing monomers for use in forming the crosslinked sulfonate-containing polymers described herein may include, but are not limited to, N-vinyl-2-pyrrolidone; N-vinyl-2-caprolactam; N-vinyl-piperidone; N-vinyl-3-methyl pyrrolidone; N-vinyl-4-methylpyrrolidone; N-vinyl-5-methylpyrrolidone; N-vinyl-3-ethyl pyrrolidone; N-vinyl-3-butyl pyrrolidone; N-vinyl-3,3-dimethylpyrrolidone; N-vinyl-4, 5-di methylpyrrolidone; N-vinyl-5,5-dimethylpyrrolidone; N-vinyl-3,3,5-trimethylpyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; N-vinylformamide; N-vinylacetamide; N-vinylpropanamide; N-vinyl-N-methylacetamide; and any combination thereof. In some embodiments, the N-vinyl amide-containing monomer may be one or more of N-vinyl-2-pyrrolidone, N-vinyl-piperidone, N-vinyl-2-caprolactam, N-vinylformamide, N-vinylacetamide, and/or N-vinyl-N-methylacetamide.

In some embodiments, the second repeating unit may be a terminal double bond-containing monomer in lieu of or in addition to the N-vinyl amide-containing monomer, and present in the same amount as described herein (of from about 1% to about 50% by weight of the reactants). Suitable examples of such terminal double bond-containing monomers may include, but are not limited to, acrylamide, N-substituted acrylamides, methacrylamide, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinylimidazole, allylimidazole, diallyldimethylammonium halide, any salt thereof, and any combination thereof.

Accordingly, in some embodiments, the first repeating unit may be in the range of between about 50% and about 99.99% by weight of the reactants and the second repeating unit may be in the range of between about 1% and about 50% by weight of the reactants, encompassing any value and subset therebetween. In other embodiments, the relative ranges of the first repeating unit and the second repeating unit (by weight of the reactants) may be in the range from 60%-99.99% and the second repeating unit in the range from 1%-40%, or the first repeating unit may be in the range from 65%-99.99% and the second repeating unit in the range from 1%-35%, or the first repeating unit may be in the range from 70%-99.99% and the second repeating unit in the range from 1%-30%, or the first repeating unit may be in the range from 75%-99.99% and the second repeating unit in the range from 1%-25%, or the first repeating unit may be in the range from 80%-99.99% and the second repeating unit in the range from 1%-20%, or the first repeating unit may be in the range from 85%-99.99% and the second repeating unit in the range from 1%-15%, or the first repeating unit may be in the range from 90%-99.99% and the second repeating unit in the range from 1%-10%, encompassing any value and subset therebetween.

The amount of the first repeating unit and the amount of the optional second repeating unit may depend on a number of factors including, but not limited to, the type of first and second repeating unit(s) selected, the desired viscosity and/or fluid loss effect when included in a treatment fluid, the type of crosslinker(s) selected, and the like.

A crosslinker may be included in the crosslinked sulfonate-containing polymers described in the embodiments herein. In some embodiments, the crosslinker may be present in an amount in the range of a lower limit of about 0.01% to an upper limit of about 25% by weight of the reactants, encompassing any value and subset therebetween. By way of example, in some embodiments, the crosslinker by weight of the reactants may be between 1%-25%, 2%-25%, 3%-25%, 4%-25%, 5%-25%, 6%-25%, 7%-25%, 8%-25%, 9%-25%, 10%-25%, 11%-25%, 12%-25%, 13%-25%, 14%-25%, 15%-25%, 16%-25%, 17%-25%, 18%-25%, 19%-25%, 20%-25%, 21%-25%, 22%-25%, 23%-25%, 24%-25%, 4%-22%, 5%-20%, 8%-18%, or 10%-15%. In some embodiments, the crosslinker may be present in an amount of greater than about 9%, up to about 25% by weight of the reactants, encompassing any value and subset therebetween.

In some embodiments, the crosslinker may be any crosslinker having two olefinic bonds. Conjugated olefinic bonds may also be suitable (e.g., dienes). For example, the crosslinker may be a crosslinker having at least two vinyl groups; at least two allyl groups; at least two acrylate groups; at least two methacrylate groups; at least two acrylamide groups; at least two methacrylamide groups; and/or at least two groups from at least two of a vinyl group, an allyl group, an acrylate group, a methacrylate group, an acrylamide group, and a methacrylamide group. Any combination of these groups may also be used in forming the crosslinked sulfonate-containing polymer of the present disclosure. Examples of suitable crosslinkers having at least two vinyl groups may include, but are not limited to, divinyl ether; a divinyl ester; a divinyl ether of a polyglycol; a divinyl ether of a polyol; a vinyl ether of a polyol; ethylene glycol divinyl ether; triethylene glycol divinyl ether; poly(ethylene glycol) divinyl ether; 1,3-divinyl-2-imidazolidinone; divinylbenzene; ethylidene pyrrolidone; ethylidene bis(N-vinylpyrrolidone); and any combination thereof. Examples of suitable crosslinkers having at least two allyl groups may include, but are not limited to, diallyl ether; a diallyl ester; an allyl ether of a polyglycol; an allyl ether of a polyol; an allyl amine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine; and any combination thereof.

Examples of suitable crosslinkers having at least two acrylate groups may include, but are not limited to, ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof. Examples of suitable crosslinkers having at least two methacrylate groups may include, but are not limited to, ethylene glycol dimethacrylate; poly(ethylene glycol) dimethacrylate; 1,1,1-trimethylolpropane trimethacrylate; pentaerythritol trimethacrylate; pentaerythritol tetramethacrylate; and any combination thereof. Examples of suitable crosslinkers having at least two acrylamide groups may include, but are not limited to, N,N'-substituted bisacrylamide; N,N'-methylenebis(acrylamide); and any combination thereof. Examples of suitable crosslinkers having at least two methacrylamide groups may include, but are not limited to, N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof.

Examples of suitable crosslinkers having at least two groups from at least two of a vinyl group, an allyl group, an acrylate group, a methacrylate group, an acrylamide group, and a methacrylamide group may include, but are not limited to, an allyl acrylate having an allyl group and an acrylate group); N,N-diallylacrylamide (i.e., having two allyl group and an acrylamide group); N-vinyl-3(E)-ethylidene pyrrolidone (i.e., having a vinyl group and an acrylamide group); and any combination thereof.

In some embodiments, the crosslinked sulfonate-containing polymers of the present disclosure may include a first crosslinker and a second crosslinker in a combined amount as the crosslinkers discussed above (i.e., from about 0.01% to about 25% by weight of the reactants, or from about 9% to about 25% by weight of the reactants, encompassing any value and subset therebetween. In some embodiments, the first crosslinker may be a crosslinker with at least two allyl groups. The second crosslinker may be a crosslinker with at least two vinyl groups; a crosslinker with at least two acrylate groups; a crosslinker with at least two methacrylate groups; a crosslinker with at least two acrylamide groups; a crosslinker with at least two methacrylamide groups; and/or a crosslinker with at least two groups from at least two of a vinyl group, an allyl group, an acrylate group, a methacrylate group, an acrylamide group, and a methacrylamide group. Specific examples of the first and second crosslinkers include any of those listed above.

In some embodiments, where a first and second crosslinker are selected according to the present disclosure, the first and second crosslinker may be present in a ratio of a lower limit of about 0.1:14.9, 0.5:14:9, 1:14.9, 1.5:14.9, 2:14.9, 2.5:14.9, 3:14.9, 3.5:14.9, 4:14.9, 4.5:14.9, 5:14.9, 5.5:14.9, 6:14.9, 6.5:14.9, 7:14.9, 7.5:14.9, 8:14.9, 8.5:14.9, 9:14.9, 9.5:14.9, 10:14.9, 10.5:14.9, 11:14.9, 11.5:14.9, 12:14.9, 12.5:14.9, 13:14.9, 13.5:14.9, 14:14.9, 14.5:14.9, and 14.9:14.9 to an upper limit of about 14.9:0.1, 14.5:0.1, 14:0.1, 13.5:0.1, 13:0.1, 12.5:0.1, 12:0.1, 11.5:0.1, 11:0.1, 10.5:0.1, 10:0.1, 9.5:0.1, 9:0.1, 8.5:0.1, 8:0.1, 7.5:0.1, 7:0.1, 6.5:0.1, 6:0.1, 5.5:0.1, 5:0.1, 4.5:0.1, 4:0.1, 3.5:0.1, 3:0.1, 2.5:0.1, 2:0.1, 1.5:0.1, 1:0.1, 0.5:0.1, and 0.1:0.1, encompassing any value and subset therebetween.

In some embodiments, the first crosslinker may be pentaerythritol allyl ether and the second crosslinker may be 1,3-divinyl-2-imidazolidonone. In such embodiments, the pentaerythritol allyl ether may be present in a ratio to the 1,3-divinyl-2-imidazolidonone in the range of a lower limit of about 0.5:14.5, 1:14.5, 1.5:14.5, 2:14.5, 2.5:14.5, 3:14.5, 3.5:14.5, 4:14.5, 4.5:14.5, 5:14.5, 5.5:14.5, 6:14.5, 6.5:14.5, 7:14.5, 7.5:14.5, 8:14.5, 8.5:14.5, 9:14.5, 9.5:14.5, 10:14.5, 10.5:14.5, 11:14.5, 11.5:14.5, 12:14.5, 12.5:14.5, 13:14.5, 13.5:14.5, 14:14.5, and 14.5:14.5 to an upper limit of about 14.5:0.5, 14:0.5, 13.5:0.5, 13:0.5, 12.5:0.5, 12:0.5, 11.5:0.5, 11:0.5, 10.5:0.5, 10:0.5, 9.5:0.5, 9:0.5, 8.5:0.5, 8:0.5, 7.5:0.5, 7:0.5, 6.5:0.5, 6:0.5, 5.5:0.5, 5:0.5, 4.5:0.5, 4:0.5, 3.5:0.5, 3:0.5, 2.5:0.5, 2:0.5, 1.5:0.5, 1:0.5, 0.5:0.5, encompassing any value and subset therebetween.

In other embodiments, the first crosslinker may be pentaerythritol allyl ether and the second crosslinker may be N,N'-methylenebis(acrylamide). In such embodiments, the pentaerythritol allyl ether may be present in a ratio to the N,N'-methylenebis(acrylamide) in the range of a lower limit of about 0.2:14.8, 0.5:14.8, 1:14.8, 1.5:14.8, 2:14.8, 2.5:14.8, 3:14.8, 3.5:14.8, 4:14.8, 4.5:14.8, 5:14.8, 5.5:14.8, 6:14.8, 6.5:14.8, 7:14.8, 7.5:14.8, 8:14.8, 8.5:14.8, 9:14.8, 9.5:14.8, 10:14.8, 10.5:14.8, 11:14.8, 11.5:14.8, 12:14.8, 12.5:14.8, 13:14.8, 13.5:14.8, 14:14.8, 14.5:14.8, and 14.8:14.8 to an upper limit of about 14.8:0.2, 14.5:0.2, 14:0.2, 13.5:0.2, 13:0.2, 12.5:0.2, 12:0.2, 11.5:0.2, 11:0.2, 10.5:0.2, 10:0.2, 9.5:0.2, 9:0.2, 8.5:0.2, 8:0.2, 7.5:0.2, 7:0.2, 6.5:0.2, 6:0.2, 5.5:0.2, 5:0.2, 4.5:0.2, 4:0.2, 3.5:0.2, 3:0.2, 2.5:0.2, 2:0.2, 1.5:0.2, 1:0.2, 0.5:0.2, 0.2:0.2, encompassing any value and subset therebetween.

In some embodiments, the crosslinked sulfonate-containing polymer of the present disclosure may be present in the treatment fluids described herein in an amount sufficient to provide the desired rheological properties, such as viscosity, and/or the desired fluid loss properties to the treatment fluids. In some embodiments, the crosslinked sulfonate-containing polymer may be present in the treatment fluid in an amount of from a lower limit of about 0.1% to an upper limit of about 10% by weight of the treatment fluid, encompassing any value and subset therebetween.

In some embodiments, the treatment fluids may further comprise certain additives that affect the rheology or properties of the treatment fluid or are designed to facilitate a certain subterranean formation operation, such as those described herein. For example, some suitable additives may include, but are not limited to, a weighting agent, a rheology modifier, a pH buffer, a defoaming agent, a shale stabilizer, and any combination thereof.

The weighting agent may be used to impart density to a treatment fluid that, during a subterranean formation operation, may be useful in, inter alia, controlling formation pressures, preventing formation caving, facilitating pipe pulling, and the like. Examples of suitable weighting agents for use in the treatment fluids described herein may include, but are not limited to, barium sulfate, hematite, calcium carbonate, manganese tetraoxide, galena, ilmenite, iron oxide, siderite, celestite, dolomite, strontium sulfate, and any combination thereof. In some embodiments, the weighting agent may be present in the range of from a lower limit of about 0.5% to an upper limit of about 90% by weight of the treatment fluid, encompassing any value and subset therebetween. By way of example, in some embodiments, the weighting agent by weight of the treatment fluid may be between 0.5%-90%, 1%-90%, 5%-90%, 10%-90%, 0.5%-80%, 5%-80%, 10%-75%, or 10%-50%.

The rheology modifier may affect the rheology of the treatment fluids described herein, such as by influencing the viscosity (e.g., thinning the treatment fluid), acting as a dispersant or deflocculant, and the like. Suitable rheology modifiers may include, but are not limited to, a lignite, a lignosulfonate (e.g., an alkaline earth metal lignosulfonate, an alkali metal lignosulfonate, an ammonium lignosulfonate, and the like), a tannin, an alcohol derivative, a synthetic polymer (e.g., polyvinyl pyrrolidone, a copolymer of acrylamide, an acrylamide derivative, and the like), and any combination thereof. In some embodiments, the rheology modifier may be present in the range of from a lower limit of about 0.01% to an upper limit of about 3% by weight of the treatment fluid, encompassing any value and subset therebetween. By way of example, in some embodiments, the rheology modifier by weight of the treatment fluid may be between 0.05%-3%, 0.5%-2.5%, 1%-2.5%, 0.1%-2%, 1%-3%, 0.1%-1.5%, or 1.5%-3%.

The pH buffer may be used to control the pH of the treatment fluid, which may in some instances affect the operability of certain other additives and/or the crosslinked sulfonate-containing polymer itself. Suitable pH buffers include any acid and any base that is suitable for use in a subterranean formation operation and that does not adversely affect the operability of the components in a treatment fluid. Examples of such suitable pH buffers may include, but are not limited to, an oxide (e.g., magnesium oxide, calcium oxide, and the like), a hydroxide (e.g., sodium hydroxide, magnesium hydroxide, calcium hydroxide, potassium hydroxide, lithium hydroxide, and the like), a carbonate (e.g., sodium carbonate, potassium carbonate, sodium bicarbonate, sodium sesquicarbonate, and the like), a phosphate (sodium phosphate, potassium phosphate, sodium hydrogen phosphate, potassium hydrogen phosphate, sodium dihydrogen phosphate, potassium dihydrogen phosphate, and the like), a diacetate (e.g., sodium diacetate, potassium diacetate, ammonium diacetate, and the like), sodium borate, fumaric acid, formic acid, hydroxyfluoboric acid, polyaspartic acid, hydrochloric acid, acetic acid, acetic anhydride, hydrofluoric acid, polysuccinimide, sulfamic acid, and any combination thereof. In some embodiments, the pH buffer may be present in the range of from a lower limit of about 0.01%, 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the treatment fluid, encompassing any value and subset therebetween.

A defoaming agent additive may be included in the treatment fluids comprising the crosslinked sulfonate-containing polymer(s) described herein. The defoaming agent may be used to reduce the foam of the treatment fluid. Examples of suitable defoaming agents may include, but are not limited to, a straight-chain n-alcohol, a polyether polyol, particulate graphite, particulate aluminum stearate, particulate hydrophobically-modified clay, alkylene glycol, polyalkylene glycol, silicone oil, a silicone oil emulsion, a silicone-glycol compound, a silicone-silica adduct, a silicone-silica adduct emulsion, a hydrocarbon-based mineral oil, an organosiloxane, a metal soap, and any combination thereof. In some embodiments, the defoaming additive may be present in the range of from a lower limit of about 0.001% to an upper limit of about 2% by weight of the treatment fluid, encompassing any value and subset therebetween. By way of example, in some embodiments, the defoaming additive by weight of the treatment fluid may be between 0.001%-1.9%, 0.001%-1.5%, 0.005%-2%, 0.005%-1.5%, 0.01%-2%, 0.01%-1.5%, 0.05%-2%, or 0.05%-1.5%.

The shale stabilizer may be included in the treatment fluids comprising the crosslinked sulfonate-containing polymer(s) of the present disclosure to inhibit shale and clay within a subterranean formation (e.g., on a surface of a wellbore) from reacting with the water phase of the treatment fluid, minimizing sticking swelling, and sloughing of such shale and clay, thereby increasing wellbore stability. As used herein, the term "shale stabilizer" encompasses clay stabilizers, as well, unless specifically stated otherwise. Suitable shale stabilizers for use in the treatment fluids described herein may include, but are not limited to, a salt of an alkali metal (e.g., potassium chloride, sodium chloride, and the like), an alkali metal acetate, ammonium chloride, tetramethyl ammonium chloride, and any combination thereof. In some embodiments, the shale stabilizer may be present in the range of from a lower limit of about 0.1% to an upper limit of about 40% by weight of the treatment fluid, encompassing any value and subset therebetween. By way of example, in some embodiments, the shale stabilizer by weight of the treatment fluid may be between 0.1%-35%, 0.1%-30%, 5%-40%, 5%-30%, 10%-40%, 10%-30%, 15%-40%, or 15%-21%

In other embodiments, additional additives may be included in the treatment fluids, without departing from the scope of the present disclosure. Such additional additives may include, but are not limited to, a salt, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, an oxygen scavenger, a hydrogen sulfide scavenger, and any combination thereof.

In various embodiments, the drilling fluids described herein may include one or more additive components such as: COLDTROL® (a thinner, available from Halliburton Energy Services, Inc.), ATC® (a modified ester thinner, available from Halliburton Energy Services, Inc.), OMC 2™ (a thinner, available from Halliburton Energy Services, Inc.), OMC 42™ (a thinner, available from Halliburton Energy Services, Inc.), RHEMOD™ (a viscosifier, available from Halliburton Energy Services, Inc.), TEMPERUS™ (a viscosifier, available from Halliburton Energy Services, Inc.), VIS-PLUS® (a viscosifier, available from Halliburton Energy Services, Inc.), TAU-MOD™ (an amorphous/fibrous viscosifier, available from Halliburton Energy Services, Inc.), ADAPTA®, DURATONE® HT (a crosslinked polymer, available from Halliburton Energy Services, Inc.), THERMO TONE™ (a synthetic polymer, available from Halliburton Energy Services, Inc.), BDF™-366 (a polymeric filtration control agent available from Halliburton Energy Services, Inc.), BDF™-454 (a polymeric filtration control agent, available from Halliburton Energy Services, Inc.), LIQUITONE™ (a polymeric filtration control agent, available from Halliburton Energy Services, Inc.), FACTANT™ (an emulsion stabilizer, available from Halliburton Energy Services, Inc.), LE SUPERMUL™ (an emulsifier, available from Halliburton Energy Services, Inc.), EZ MUL® NT (an emulsifier, available from Halliburton Energy Services, Inc.), FORTI-MUL® (an emulsifier, available from Halliburton Energy Services, Inc.), DRILTREAT® (a wetting agent, available from Halliburton Energy Services, Inc.), AQUATONE-S™ (a wetting agent, available from Halliburton Energy Services, Inc.), BARACARB® (calcium carbonate particles, available from Halliburton Energy Services, Inc.) (e.g., BARACARB® 5 and BARACARB® 25), BAROID® (a weighting agent, available from Halliburton Energy Services, Inc.), BAROLIFT® (a sweeping agent, available from Halliburton Energy Services, Inc.), SWEEP-WATE® (a sweeping agent, available from Halliburton Energy Services, Inc.), BDF-508 (a rheology modifier, available from Halliburton Energy Services, Inc.), GELTONE® II (an organophilic clay, available from Halliburton Energy Services, Inc.), X-TEND® II (a viscosifier, available from Halliburton Energy Services, Inc.), PAC™-R (a viscosifier, available from Halliburton Energy Services, Inc.), PAC™-L (a viscosifier, available from Halliburton Energy Services, Inc.), LIQUI-VIS® EP (a viscosifier, available from Halliburton Energy Services, Inc.), BRINEDRIL-VIS™ (a viscosifier, available from Halliburton Energy Services, Inc.), BARAZAN® (a viscosifier, available from Halliburton Energy Services, Inc.), N-VIS® (a viscosifier, available from Halliburton Energy Services, Inc.), AQUAGEL® (a viscosifier, available from Halliburton Energy Services, Inc.), THERMA-CHEK® (a filtration control agent, available from Halliburton Energy Services, Inc.), N-DRIL™ (a filtration control agent, available from Halliburton Energy Services, Inc.), N-DRIL™ HT PLUS (a filtration control agent, available from Halliburton Energy Services, Inc.), IMPERMEX® (a filtration control agent, available from Halliburton Energy Services, Inc.), FILTERCHEK™ (a filtration control agent, available from Halliburton Energy Services, Inc.), DEXTRID® (a filtration control agent, available from Halliburton Energy Services, Inc.), CARBONOX® (a filtration control agent, available from Halliburton Energy Services, Inc.), BARANEX® (a filtration control agent, available from Halliburton Energy Services, Inc.), PERFORMATROL® (a shale stabilizer, available from Halliburton Energy Services, Inc.), GEM™ (a shale stabilizer, available from Halliburton Energy Services, Inc.), EZ-MUD® (a shale stabilizer, available from Halliburton Energy Services, Inc.), CLAY GRABBER® (a shale stabilizer, available from Halliburton Energy Services, Inc.), CLAYSEAL® (a shale stabilizer, available from Halliburton Energy Services, Inc.), CRYSTAL-DRIL® (a shale stabilizer, available from Halliburton Energy Services, Inc.), CLAY SYNC™ II (a shale stabilizer, available from Halliburton Energy Services, Inc.), NXS-LUBE™ (a lubricant, available from Halliburton Energy Services, Inc.), EP MUD-LUBE® (a lubricant, available from Halliburton Energy Services, Inc.), DRIL-N-SLIDE™ (a lubricant, available from Halliburton Energy Services, Inc.), QUIK-THIN® (a thinner, available from Halliburton Energy Services, Inc.), IRON-THIN™ (a thinner, available from Halliburton Energy Services, Inc.), THERMA-THIN® (a synthetic polymer thinner, available from Halliburton Energy Services, Inc.), ENVIRO-THIN™ (a thinner, available from Halliburton Energy Services, Inc.), SOURSCAV™ (a scavenger, available from Halliburton Energy Services, Inc.), BARA-COR® (a corrosion inhibitor, available from Halliburton Energy Services, Inc.), SWEEP-WATE®, STOPPIT™ (a lost circulation material, available from Halliburton Energy Services, Inc.), PLUG-GIT®, DUO-SQUEEZE® (a lost circulation material, available from Halliburton Energy Services, Inc.), BAROFIBRE™ (a lost circulation material, available from Halliburton Energy Services, Inc.), STEEL-SEAL® (a lost circulation material, available from Halliburton Energy Services, Inc.), HYDRO-PLUG® (a lost circulation material, available from Halliburton Energy Services, Inc.), BARABRINE® DEFOAM (a defoamer, available from Halliburton Energy Services, Inc.), BARA-DEFOAM® HP (a polyether polyol defoaming agent, available from Halliburton Energy Services, Inc.), OXYGON™ (an oxygen scavenger, available from Halliburton Energy Services, Inc.), BARASCAV D™ (an oxygen scavenger, available from Halliburton Energy Services, Inc.), MICROMAX (a defoamer, available from Halliburton Energy Services, Inc.), BARABUF® (a magnesium oxide pH buffer, available from Halliburton Energy Services, Inc.), and any combination thereof.

In some instances, the drilling fluids described herein may be substantially free of clay (e.g., have less than about 5 wt %, 4, 3, 2, 1.5, 1, 0.5, 0.4, 0.3, 0.2, 0.1, 0.05, or less than about 0.01 wt % of the drilling fluid).

In some instances, the drilling fluids described herein may be substantially free of solid weighting agents like barite (e.g., have less than about 5 wt %, 4, 3, 2, 1.5, 1, 0.5, 0.4, 0.3, 0.2, 0.1, 0.05, or less than about 0.01 wt % of the drilling fluid).

The drilling fluids described herein that comprise crosslinked sulfonate-containing polymers dispersed in a monovalent brine having a density of about 8 to about 20 lb/gal may be circulated through a wellbore penetrating a subterranean formation while drilling the at least a portion of wellbore (e.g., the portion of the wellbore penetrating a hydrocarbon-containing portion of the wellbore).

The exemplary drilling fluids disclosed herein that comprise crosslinked sulfonate-containing polymers dispersed in a monovalent brine having a density of about 8 to about 20 lb/gal may directly or indirectly affect one or more components or pieces of equipment associated with the preparation, delivery, recapture, recycling, reuse, and/or disposal of the disclosed drilling fluids. For example, and with reference to FIG. 1, the disclosed drilling fluids may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed components of the drilling fluid 122 may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed components of the drilling fluid 122 may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed components of the drilling fluid 122 may be stored, reconditioned, and/or regulated until added to the drilling fluid 122.

As mentioned above, the disclosed drilling fluids 122 that comprise crosslinked sulfonate-containing polymers dispersed in a monovalent brine having a density of about 8 to about 20 lb/gal may directly or indirectly affect the components and equipment of the drilling assembly 100. For example, the disclosed drilling fluids 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the exemplary drilling fluids 122.

The disclosed drilling fluids 122 may directly or indirectly affect the pump 120, which representatively includes any conduits, pipelines, trucks, tubulars, and/or pipes used to fluidically convey the drilling fluids 122 downhole, any pumps, compressors, or motors (e.g., topside or downhole) used to drive the drilling fluids 122 into motion, any valves or related joints used to regulate the pressure or flow rate of the drilling fluids 122, and any sensors (i.e., pressure, temperature, flow rate, etc.), gauges, and/or combinations thereof, and the like. The disclosed drilling fluids 122 may also directly or indirectly affect the mixing hopper 134 and the retention pit 132 and their assorted variations.

The disclosed drilling fluids 122 may also directly or indirectly affect the various downhole equipment and tools that may come into contact with the drilling fluids 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluids 122 may also directly or indirectly affect any downhole heat exchangers, valves and corresponding actuation devices, tool seals, packers and other wellbore isolation devices or components, and the like associated with the wellbore 116. The disclosed drilling fluids 122 may also directly or indirectly affect the drill bit 114, which may include, but is not limited to, roller cone bits, PDC bits, natural diamond bits, any hole openers, reamers, coring bits, etc.

While not specifically illustrated herein, the disclosed drilling fluids 122 may also directly or indirectly affect any transport or delivery equipment used to convey the drilling fluids 122 to the drilling assembly 100 such as, for example, any transport vessels, conduits, pipelines, trucks, tubulars, and/or pipes used to fluidically move the drilling fluids 122 from one location to another, any pumps, compressors, or motors used to drive the drilling fluids 122 into motion, any valves or related joints used to regulate the pressure or flow rate of the drilling fluids 122, and any sensors (i.e., pressure and temperature), gauges, and/or combinations thereof, and the like.

Embodiments disclosed herein include:

Embodiment A—drilling at least a portion of a wellbore penetrating a subterranean formation with a drilling fluid that comprises a crosslinked sulfonate-containing polymer dispersed in a monovalent brine having a density of about 8 lb/gal to about 20 lb/gal, wherein the crosslinked sulfonate-containing polymer comprises: reactants of a first repeating unit and a crosslinker that react to form the crosslinked sulfonate-containing polymer, wherein the first repeating unit is a sulfonic acid-containing monomer present from 50% to 99.99% by weight of the reactants, and wherein the crosslinker comprises at least two olefinic bonds;

Embodiment B—a crosslinked sulfonate-containing polymer dispersed in a monovalent brine having a density of about 8 lb/gal to about 20 lb/gal, wherein the crosslinked sulfonate-containing polymer comprises: reactants of a first repeating unit and a crosslinker that react to form the crosslinked sulfonate-containing polymer, wherein the first repeating unit is a sulfonic acid-containing monomer present from 50% to 99.99% by weight of the reactants, and wherein the crosslinker comprises at least two olefinic bonds; and Embodiment C—a drilling assembly with a drill string extending therefrom and into a wellbore in a subterranean formation with at least one depleted zone having a plurality of fractures extending from the wellbore into the at least one depleted zone; and a pump fluidly coupled to the drill string, the drill string containing a drilling fluid that comprises a crosslinked sulfonate-containing polymer dispersed in a monovalent brine having a density of about 8 lb/gal to about 20 lb/gal, wherein the crosslinked sulfonate-containing polymer comprises: reactants of a first repeating unit and a crosslinker that react to form the crosslinked sulfonate-containing polymer, wherein the first repeating unit is a sulfonic acid-containing monomer present from 50% to 99.99% by weight of the reactants, and wherein the crosslinker comprises at least two olefinic bonds.

Each of the Embodiments A, B, and C may have one or more of the following additional elements in any combination: Element 1: wherein the sulfonic acid-containing monomer is selected from the group consisting of an acrylic sulfonic acid, a methylallyl sulfonic acid, an allyl sulfonic acid, a styrene sulfonic acid, a vinyl sulfonic acid, a vinyl aromatic sulfonic acid, any salt thereof, and any combination thereof; Element 2: wherein the sulfonic acid-containing monomer is selected from the group consisting of 2-acrylamido-2-methylpropane sulfonic acid, 2-(meth)acrylamido-2-methylpropanesulfonic acid, α-methyl styrenesulfonic acid, 2-sulfoethyl methacrylate, vinylbenzene sulfonic acid, 3-allyloxy-2-hydroxy-1-propanesulfonic acid, any salt thereof, any ester thereof, and any combination thereof; Element 3: wherein the crosslinked sulfonate-containing polymer further comprises reactants of a second repeating unit selected from the group consisting of an N-vinyl amide-containing monomer, a terminal double bond-containing monomer, and any combination thereof that is present from 1% to 50% by weight of the reactants; Element 4: Element 3 and wherein the N-vinyl amide-containing monomer is selected from the group consisting of a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof; Element 5: Element 3 and wherein the N-vinyl amide-containing monomer is selected from the group consisting of N-vinyl-2-pyrrolidone; N-vinyl-2-caprolactam; N-vinyl-piperidone; N-vinyl-3-methyl pyrrolidone; N-vinyl-4-methylpyrrolidone; N-vinyl-5-methylpyrrolidone; N-vinyl-3-ethyl pyrrolidone; N-vinyl-3-butyl pyrrolidone; N-vinyl-3,3-dimethylpyrrolidone; N-vinyl-4,5-dimethylpyrrolidone; N-vinyl-5,5-dimethylpyrrolidone; N-vinyl-3,3,5-trimethylpyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; N-vinylformamide; N-vinylacetamide; N-vinylpropanamide; N-vinyl-N-methylacetamide; and any combination thereof; Element 6: Element 3 and wherein the terminal double bond-containing monomer is selected from the group consisting of acrylamide, N-substituted acrylamides, methacrylamide, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinylimidazole, allylimidazole, diallyldimethylammonium halide, any salt thereof, and any combination thereof; Element 7: Element 3 and wherein the first repeating unit is present from about 75% to 99%, and the second repeating unit is present from 1% to 25% by weight of the reactants; Element 8: wherein the crosslinker is selected from the group consisting of a crosslinker with at least two vinyl groups; a crosslinker with at least two allyl groups; a crosslinker with at least two acrylate groups; a crosslinker with at least two methacrylate groups; a crosslinker with at least two acrylamide groups; a crosslinker with at least two methacrylamide groups; a crosslinker with at least two groups from at least two of a vinyl group, an allyl group, an acrylate group, a methacrylate group, an acrylamide group, and a methacrylamide group; and any combination thereof; Element 9: Element 8 and wherein the crosslinker with at least two vinyl groups is selected from the group consisting of divinyl ether; divinyl ester; a divinyl ether of a polyglycol; a divinyl ether of a polyol; a vinyl ether of a polyol; ethylene glycol divinyl ether; triethylene glycol divinyl ether; poly(ethylene glycol) divinyl ether; 1,3-divinyl-2-imidazolidinone; divinylbenzene; ethylidene pyrrolidone; ethylidene bis(N-vinylpyrrolidone); and any combination thereof; Element 10: Element 8 and wherein the crosslinker with at least two allyl groups is selected from the group consisting of diallyl ether; an allyl ether of a diallyl ether; diallyl ester; an allyl ether of a polyglycol; an allyl ether of a polyol; an allyl amine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine; and any combination thereof; Element 11: Element 8 and wherein the crosslinker with at least two acrylate groups is selected from the group consisting of ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof; Element 12: Element 8 and wherein the crosslinker with at least two methacrylate groups is selected from the group consisting of ethylene glycol di(meth)acrylate; poly(ethylene glycol) di(meth)acrylate; 1,1,1-trimethylolpropane tri(meth)acrylate; pentaerythritol tri(meth)acrylate; pentaerythritol tetra (meth)acrylate; and any combination thereof; Element 13: Element 7 and wherein the crosslinker with at least two acrylamide groups is selected from the group consisting of N,N'-substituted bisacrylamide; N,N'-methylenebis(acrylamide); and any combination thereof; Element 14: Element 8 and wherein the crosslinker with at least two methacrylamide groups is selected from the group consisting of N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof; Element 15: Element 8 and wherein the crosslinker with at least two groups from at least two of a vinyl group, an allyl group, an acrylate group, a methacrylate group, an acrylamide group, and a methacrylamide group is selected from the group consisting of an allyl acrylate; N,N-diallylacrylamide; N-vinyl-3(E)-ethylidene pyrrolidone; and any combination thereof; Element 16: wherein the crosslinker is present in the range of about 0.01% to about 25% by weight of the reactants; and Element 17: wherein the crosslinker is present in the range of about 9% to about 25% by weight of the reactants.

By way of non-limiting example, exemplary combinations applicable to Embodiments A, B, and C include: Element 1 and/or Element 2 in combination with Element 8 and optionally at least one of Elements 9-17; Element 1 and/or Element 2 in combination with Element 3 and optionally with at least one of Elements 4-7; Element 8 and optionally at least one of Elements 9-17 in combination with Element 3 and optionally with at least one of Elements 4-7; and Element 1 and/or Element 2 in combination with Element 3 (and optionally with at least one of Elements 4-7) and in further combination with Element 8 (and optionally at least one of Elements 9-17).

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods may also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

Fluids A, B, and C according to the formulations in Table 1 were prepared by initial hydration of a crosslinked sulfonate-containing polymer (2-acrylamido-2-methylpropane sulfonic acid/vinyl pyrrolidone copolymer crosslinked with N,N'-methylenebisacrylamide and pentaerythritol allyl ether) in the lower density formate brine of the formulation with subsequent addition of the higher density formate brine to the mixture. Then, the remaining components were added. The resulting mixture was sheared with a Silverson mixer for 5 minutes at 6,000 rpm.

The rheology and filtration control of the non-aged sample was measured, and then the fluid samples were statically aged at 400° F. for 72 hours. The rheology and filtration control efficacy of the statically aged was then measured (results provided in Table 1).

The High-Temperature, High-Pressure (HTHP) Filtration test was run in a downward manner with a 10 μm ceramic disk at 350° F. with 500 psi differential pressure. The filtrate was collected in a graduated cylinder for 30 minutes. The volume was multiplied by two to give the total fluid loss according to API Recommended Practice 13B-1.

The use of a crosslinked sulfonate-containing polymer in a potassium formate brine provided a 12.0 lb/gal fluid with good viscosity and filtration control (Table 1, A). The potassium formate-based fluid is thermally stable at 400° F. for 72 h. For example, Fluid A gave a plastic viscosity of 26 cP and a yield point of 24 lb/100 ft$^2$. After static aging for 72 h at 400° F., the fluid gave a plastic viscosity of 27 cP and yield point of 17 lb/100 ft$^2$ with an HTHP fluid loss at 350° F. of 9.4 mL. It is important to note that if some free water is not added to the formate brine, the polymer will not fully hydrate. The density range of the formate-based fluid may be adjusted further by adjusting the density of the brine used during the hydration of the crosslinked sulfonate-containing polymer. Since potassium formate brines are often used adjust the density of cesium formate brines, potassium formate brine may be used for the initial polymer hydration instead of the addition of water to the cesium formate brine. Similarly, the crosslinked sulfonate-containing polymer was also used to provide a high temperature stable 16.0 lb/gal fluid by simply adjusting the density of the brine used during initial polymer hydration (Table 1, B). The viscosity of the fluids may be adjusted by reducing the amount of the crosslinked sulfonate-containing polymer in the fluids provided that adequate filtration control is achieved or by substituting the BARACARB® 5 with MICROMAX or other acidizable weighting agents (Table 1, C). The 18.0 lb/gal fluid that contained MICROMAX provided similar viscosity and filtration control as the 12.0 lb/gal potassium formate fluid and the 16.0 lb/gal cesium formate fluid. For example, Fluid C gave a plastic viscosity of 19 cP and a yield point of 26 lb/100 ft$^2$. After static aging for 72 h at 400° F., the fluid gave a plastic viscosity of 27 cP and yield point of 20 lb/100 ft$^2$. This fluid gave only 9.0 mL of fluid loss at 350° F. Therefore, a 12.0 to 18.0 lb/gal fluid may be prepared with potassium or cesium formate brine using the crosslinked sulfonate-containing polymer as the viscosifier and filtration control agent.

TABLE 1

| | Fluid Formulations | | |
|---|---|---|---|
| Component | Fluid A | Fluid B [a,b] | Fluid C |
| 10.0 lb/gal potassium formate (bbl) [c] | 0.53 | — | — |
| 14.0 lb/gal cesium formate (bbl) [c] | — | — | 0.34 |
| 12.0 lb/gal cesium formate (bbl) [c] | — | 0.37 | — |
| crosslinked sulfonate-containing polymer (lb/bbl) | 10.0 | 10.0 | 10.0 |
| 13.1 lb/gal potassium formate (bbl) | 0.36 | — | — |
| 18.3 lb/gal cesium formate (bbl) [d] | — | 0.53 | 0.56 |
| BARABRINE ® DEFOAM (lb/bbl) | 1.5 | 1.0 | 1.5 |
| BARACARB ® 5 (lb/bbl) | 56.2 | 56.2 | — |
| BARACARB ® 25 (lb/bbl) | 14.0 | 14.0 | 24.7 |
| MICROMAX ® (lb/bbl) | — | — | 99.0 |

| | Fluid Properties | | | | | |
|---|---|---|---|---|---|---|
| Density (lb/gal) | 12.0 | | 16.0 | | 18.0 | |
| Static Aging Temperature (° F.) | — | 400 | — | 400 | — | 400 |
| 600 rpm | 76 | 71 | 60 | 59 | 64 | 74 |
| 300 rpm | 50 | 44 | 42 | 38 | 45 | 47 |
| 300 rpm | 39 | 34 | 34 | 29 | 35 | 36 |
| 300 rpm | 30 | 21 | 25 | 19 | 26 | 23 |
| 300 rpm | 16 | 4 | 12 | 5 | 14 | 5 |
| 300 rpm | 15 | 3 | 11 | 4 | 13 | 4 |
| Plastic Viscosity (cP) | 26 | 27 | 18 | 21 | 19 | 27 |
| Yield Point (lb/100 ft$^2$) | 24 | 17 | 24 | 17 | 26 | 20 |
| HTHP Filtrate at 350° F. (mL) | — | 9.4 | — | 10.4 | — | 9.0 |

[a] The crosslinked sulfonate-containing polymer did not fully hydrate in 18.3 lb/gal cesium formate brine alone.
[b] 0.4 lb/bbl BARA DEFOAM ® HP was added.
[c] The 10.0 lb/gal potassium formate brine and the 12.0 and 14.0 lb/gal cesium formate brines were prepared by diluting the corresponding higher density brine with deionized water in order to provide some free water in the formate brine.
[d] The 18.3 lb/gal cesium formate brine was diluted to a 10:1 mixture of deionized water:formate brine, resulting in a pH 10.0 cesium formate solution.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
drilling at least a portion of a wellbore penetrating a subterranean formation with a drilling fluid that comprises a crosslinked sulfonate-containing polymer dispersed in a monovalent brine having a density of about 8 lb/gal to about 20 lb/gal, wherein the crosslinked sulfonate-containing polymer comprises: reactants of a first repeating unit and a crosslinker that react to form the crosslinked sulfonate-containing polymer, wherein the first repeating unit is a sulfonic acid-containing monomer present from 50% to 99.99% by weight of the reactants and wherein the crosslinker comprises at least two olefinic bonds, and a plastic viscosity of the drilling fluid is within a range from 18 cP to 27 cP.

2. The method of claim 1, wherein the crosslinked sulfonate-containing polymer further comprises reactants of a second repeating unit selected from the group consisting of an N-vinyl amide-containing monomer, a terminal double bond-containing monomer, and any combination thereof that is present from 1% to 50% by weight of the reactants.

3. The method of claim 2, wherein the N-vinyl amide-containing monomer is selected from the group consisting of a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

4. The method of claim 2, wherein the N-vinyl amide-containing monomer is selected from the group consisting of N-vinyl-2-pyrrolidone; N-vinyl-2-caprolactam; N-vinyl-piperidone; N-vinyl-3-methyl pyrrolidone; N-vinyl-4-methyl-pyrrolidone; N-vinyl-5-methylpyrrolidone; N-vinyl-3-ethyl pyrrolidone; N-vinyl-3-butyl pyrrolidone; N-vinyl-3,3-dimethylpyrrolidone; N-vinyl-4, 5-dimethylpyrrolidone; N-vinyl-5,5-dimethylpyrrolidone; N-vinyl-3,3,5-trimethylpyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; N-vinylformamide; N-vinylacetamide; N-vinylpropanamide; N-vinyl-N-methylacetamide; and any combination thereof.

5. The method of claim 2, wherein the terminal double bond-containing monomer is selected from the group consisting of acrylamide, N-substituted acrylamides, methacrylamide, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinylimidazole, allylimidazole, diallyldimethylammonium halide, any salt thereof, and any combination thereof.

6. The method of claim 1, wherein the crosslinked sulfonate-containing polymer is present in the drilling fluid at about 0.1% to about 10% by weight of the drilling fluid.

7. The method of claim 1, wherein the sulfonic acid-containing monomer is selected from the group consisting of an acrylic sulfonic acid, a methylallyl sulfonic acid, an allyl sulfonic acid, a styrene sulfonic acid, a vinyl sulfonic acid, a vinyl aromatic sulfonic acid, any salt thereof, and any combination thereof.

8. The method of claim 1, wherein the sulfonic acid-containing monomer is selected from the group consisting of 2-acrylamido-2-methylpropane sulfonic acid, 2-(meth)acrylamido-2-methylpropanesulfonic acid, α-methyl styrenesulfonic acid, 2-sulfoethyl methacrylate, vinylbenzene sulfonic acid, 3-allyloxy-2-hydroxy-1-propanesulfonic acid, any salt thereof, any ester thereof, and any combination thereof.

9. The method of claim 1, wherein the crosslinker is selected from the group consisting of a crosslinker with at least two vinyl groups; a crosslinker with at least two allyl groups; a crosslinker with at least two acrylate groups; a crosslinker with at least two methacrylate groups; a crosslinker with at least two acrylamide groups; a crosslinker with at least two methacrylamide groups; a crosslinker with at least two groups from at least two of a vinyl group, an allyl group, an acrylate group, a methacrylate group, an acrylamide group, and a methacrylamide group; and any combination thereof.

10. The method of claim 1, wherein the monovalent brine comprises at least one selected from the group consisting of lithium formate, sodium formate, potassium formate, rubidium formate, cesium formate, lithium acetate, sodium acetate, potassium acetate, rubidium acetate, cesium acetate, lithium chloride, sodium chloride, potassium chloride, rubidium chloride, cesium chloride, lithium bromide, sodium bromide, potassium bromide, rubidium bromide, cesium bromide, and any combination thereof.

11. The method of claim 1, wherein the portion of the wellbore extends through a hydrocarbon-containing portion of the subterranean formation.

12. A method comprising:
drilling at least a portion of a wellbore penetrating a subterranean formation with a drilling fluid that comprises a crosslinked sulfonate-containing polymer dispersed in a monovalent brine having a density of about 8 lb/gal to about 20 lb/gal, wherein the crosslinked sulfonate-containing polymer comprises: reactants of a first repeating unit, a second repeating unit and a crosslinker that react to form the crosslinked sulfonate-containing polymer, wherein the first repeating unit is a sulfonic acid-containing monomer present from 50% to 99.99% by weight of the reactants, the second repeating unit is an N-vinyl amide-containing monomer present from 1% to 50%, and wherein the crosslinker comprises at least two olefinic bonds, and a plastic viscosity of the drilling fluid is within a range from 18 cP to 27 cP.

* * * * *